Nov. 29, 1966 T. P. FLEER 3,288,366
THERMOSTATIC GAS REGULATOR FOR BAKING AND BROILING
Filed Dec. 23, 1964 3 Sheets-Sheet 1

Thomas P. Fleer,
Inventor.
Koenig, Senniger, Powers and Leavitt,
Attorneys.

Nov. 29, 1966 T. P. FLEER 3,288,366
THERMOSTATIC GAS REGULATOR FOR BAKING AND BROILING
Filed Dec. 23, 1964 3 Sheets-Sheet 2

Nov. 29, 1966     T. P. FLEER     3,288,366

THERMOSTATIC GAS REGULATOR FOR BAKING AND BROILING

Filed Dec. 23, 1964     3 Sheets-Sheet 3

United States Patent Office
3,288,366
Patented Nov. 29, 1966

3,288,366
THERMOSTATIC GAS REGULATOR FOR
BAKING AND BROILING
Thomas P. Fleer, Affton, Mo., assignor, by mesne assignments, to Aurora Corporation of Illinois, Chicago, Ill.,
a corporation of Illinois
Filed Dec. 23, 1964, Ser. No. 420,577
12 Claims. (Cl. 236—15)

This invention relates to regulators for gas burners and more particularly to regulators for burners serving combination baking and broiling ovens of gas cooking stoves or the like.

Among the several objects of this invention may be noted the provision of improved low-cost means for on-off burner control through a range of desired lower or so-called baking temperatures and for an even or so-called straight-line modulating burner control in another range of desired higher or so-called broiling temperatures; the provision of a system of the class described which permits the use of less costly sheet metal or like burners instead of more costly cast iron burners or the like; the provision of a simple thermostatic control assembly for a system of the class described which obtains a combination of intermittent and modulating control without the use of a compound main regulator valve; and the provision of a system of the class described which admits of the use of a cycling pilot burner designed either for a large or a small gas input. Other objects and features will be in part apparent and in part pointed out hereinafter.

The invention accordingly comprises the constructions and arrangements hereinafter described, the scope of the invention being indicated in the following claims.

In the accompanying drawings, in which several of various possible embodiments of the invention are illustrated, FIG. 1 is a diagrammatic view illustrating how various burner and control parts are connected to form a complete regulating system for carrying out the invention;

Corresponding reference characters indicate corresponding parts throughout the several views of the drawings.

Although the invention described herein has general uses, a particular use is for thermostatic gas valves for oven temperature control of cooking ranges, in relation to which the invention will be described as an example.

In an oven served by the invention, a main burner serves both its baking and broiler heating sections. Baking is generally accomplished in a temperature range of approximately 250° F. to 550° F. This baking range is above a lower so-called temperature warming range from 140° F. to 200° F. and below the broiling temperature which is above 550° F. and on the order of 575° F. to 600° F. Baking in the baking range is advantageously accomplished under intermittent burner control which alternately ignites and completely shuts off the burner. This is sometimes known as on-off or discontinuous regulation. As is known by means of such regulation better baking is accomplished. For example, baked objects brown better under such regulation.

On the other hand, broiling is better accomplished when the burner is continuously modulated without ever being extinguished. A reason for this is that it is desired that smoke from broiling objects shall at all times be consumed by the flame. This is possible only when the burner is ignited during the entire period that an object is being broiled.

Figure 1:
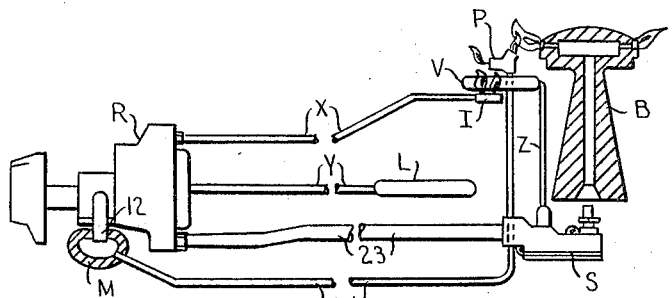
Figure 2:
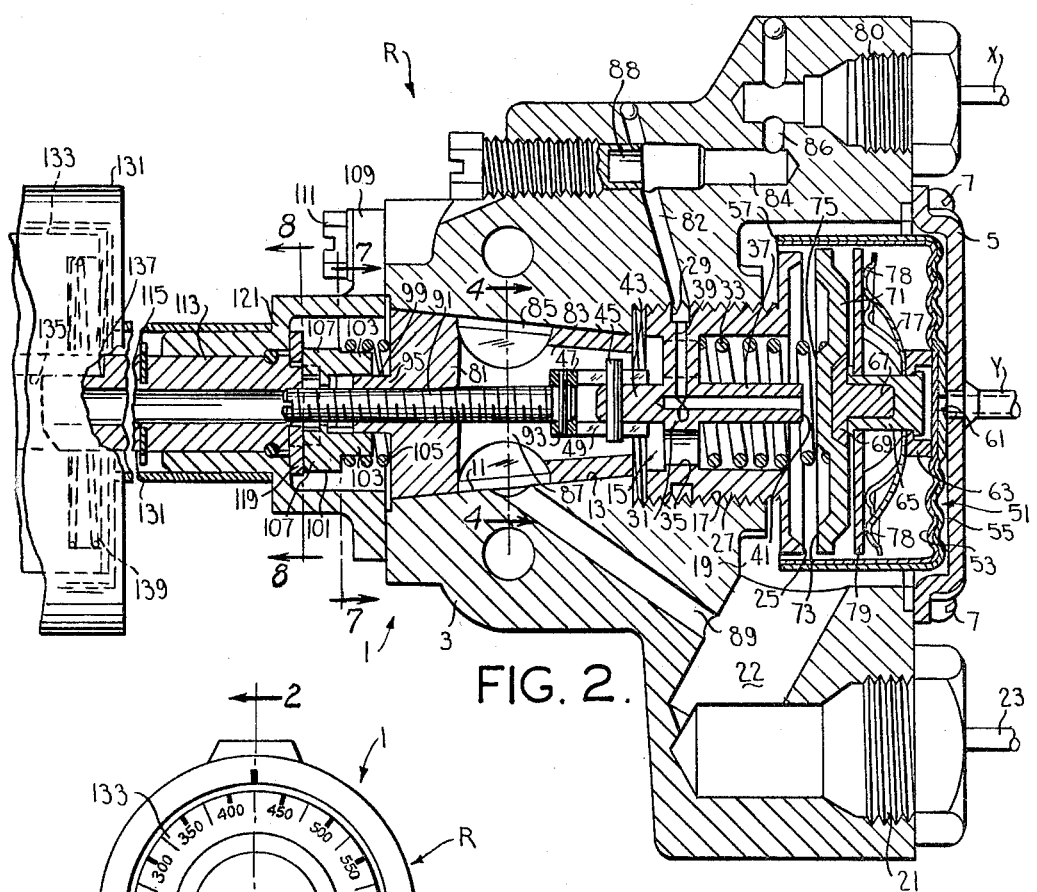
FIG. 2 is an axial section of a regulator made according to one form of the invention, the section being taken on line 2—2 of FIG. 3.
Figure 3:
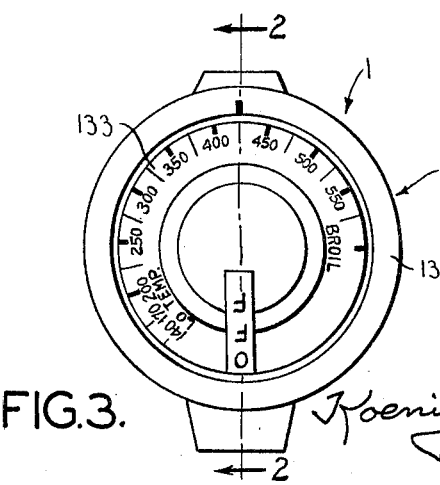
FIG. 3 is a left end view of FIG. 2 showing an adjustment of a control knob to an intermediate position for baking.

Referring now more particularly to the drawings, FIGS. 1–3 illustrate what will hereinafter be referred to as the main regulator assembly R. An operating control valve construction for burner B is designated S. Valve S may be the same as the corresponding valve shown in the Holzboog et al. United States Patent 3,065,913 issued November 27, 1962. Further description is therefore unnecessary. In FIG. 1 is shown a main oven burner B. A continuously or constantly burning pilot burner P serves to ignite the burner B and to ignite a cycling burner I. A fluid-filled temperature-responsive bulb L serves regulator R and is suitably located in the oven to be heated by burner B. Device V is another fluid-filled temperature-responsive bulb serving the safety and control valve S. Control valve S is closed when bulb V is cold and opens upon sufficient heating of bulb V. The cyclically ignited or intermittent pilot burner I is in effective heat-exchange relationship with the bulb V, but the continuously ignited or continuous pilot burner P is not. The continuous pilot burner P serves only for ignition of burner B and for ignition of the intermittent pilot burner I. Letter M designates the main gas line serving the apparatus. This is connected with the constantly burning pilot P by a line W. The intermittent pilot I is connected with the regulator R through a gas line X. The bulb L is connected with the regulator R through a fluid line Y. The bulb V is connected with the safety valve S through fluid line Z.

Numeral 1 (FIGS. 2 and 3) indicates a hollow housing formed of body 3 and cover 5, held together by screws 7. At numeral 9 (FIGS. 4–6) is shown a gas inlet which communicates with a conical valve seat 11 in body 3. An inlet fitting 12 (FIG. 1) connects inlet 9 with the gas main M. The small end 13 of conical seat 11 communicates with a main passage 15, which in turn communicates through a threaded outlet 17 with a compartment 19, the latter communicating with a main gas outlet 21 through a passage 22. The outlet 21 is connected by pipe 23 with the safety valve construction S (FIG. 1).

At numeral 25 is shown an outlet valve seat having a tubular threaded part 27 threaded in the opening 17. Part 27 has an annular groove as shown at 29 and contains a spider 31 against which a coil spring 33 is seated. The spider 31 contains openings 35. It also carries a hollow forwardly extending tubular part 37 which, through passage 39 in the spider 31, is in communication with groove 29. At the end of tube part 37 is a second valve seat 41 which is formed in the plane of seat 25. Extending oppositely from spider 31 is a cylindrical extension 43 carrying a pin 45 which slides in slots 49 of a sleeve 47.

A double-walled cup 51 is located in the compartment 19. It has an inside cup shape wall 53 and an outside cup shape wall 55, the latter being soldered or otherwise attached to the cover 5. The marginal portions 57 of the cup members 53 and 55 are sealed together as by welding or soldering, the remaining portions of the members 53 and 55 being unjoined. They are corrugated in their portions forming the inside bottom 59 of cup 51. The outside member 55 is provided with an opening 61, communicating through cover 5 with line Y. Line Y is sealed to the cover 5 and extends to the bulb L located in the space to be heated.

The bulb L, line Y and available space between the bimetallic members 53 and 55 are filled with a thermally responsive fluid which is adapted upon expansion in response to heating to enter between the members 53 and 55 for forcing them apart. This drives the bottom of the inside wall 53 to the left away from the bottom of outside wall 55. The inside wall 53 carries an attached drive member 63 which has a sliding engagement with a member 65 carried on a stem 67 of a fastening member 69, the latter being attached to a movable main valve 71. Valve 71 has a peripheral portion 73 engageable with seat 25 and a central portion 75 simultaneously engageable with seat 41.

A spring rosette 77 is attached centrally to the drive member 63. Its central portion and drive member 63 are slidable on part 65. Spring fingers 78 of the spring rosette 77 contact and press marginally against a plate 79 attached to the end of the member 65. Thus in response to increased oven temperatures applied to bulb L, its expansive fluid presses to the left the following parts, namely the inside wall 53 of cup 51, driver 63, spring rosette 77, plate 79 and valve 71. This tends to seat the parts 73 and 75 of valve 71 on seats 25 and 41, respectively. The coil spring 33 reacts from the spider 31 against the valve 71, biasing the valve toward its open position. Under conditions in which the valve 71 may have closed and further expansion of fluid occurs, drive member 63 will slide on member 65. As a result, the rosette spring 77 will deflect without damage to any parts. Upon cooling the reverse action occurs as the valve 71 moves toward its open position.

An auxiliary outlet 80 communicates with groove 29 in bushing 27 through auxiliary passages 82, 84 and 86. Gas line X leads from outlet 80 to the cycling pilot burner I (FIG. 1). Flow between groove 29 and outlet 80 is adjustable by means of an adjusting valve 88.

Figure 4:
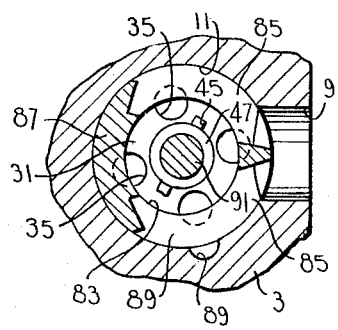
FIG. 4 is a fragmentary section taken on line 4—4 of FIG. 2 showing a manually controlled plug valve in a bake setting according to said FIG. 2.
Figure 5:
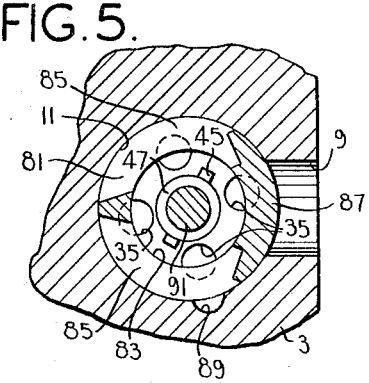
FIG. 5 is a section similar to FIG. 4 showing the plug valve rotated 180° to close the gas inlet of the valve.

At 81 is shown a manually controlled cup-shaped conical plug valve located in the conical seat 11 (FIGS. 2 and 4–6). This valve has a hollow center 83 communicating with the main passage 15. The hollow center 83 communicates with valve seat 11 and inlet 9 through passages 85. This leaves a solid portion 87 of the valve 81 for closing inlet 9 as shown in FIG. 5.

At 89 is shown a passage which extends from a center portion of valve seat 11 to the passage 22 and main outlet 21. When the solid portion 87 of valve 81 is located in one range of positions (one of which is shown in FIGS. 2 and 4), there is communication from inlet 9 through valve 81 and passage 89 to the outlet 21, bypassing the thermostatically operated valve parts 25, 73 which normally control flow of fuel to the outlet 21.

Figure 6:
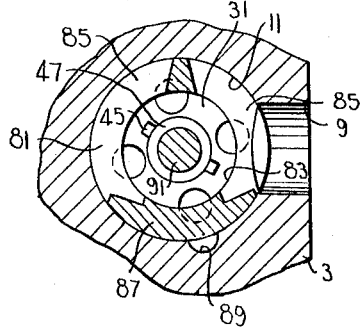
FIG. 6 is a section similar to FIGS. 4 and 5 showing the plug valve in a broil position.

FIG. 5 shows valve 81 pointed in seat 11 with its solid portion covering inlet 9, thereby closing off communication between the gas main M and both the main outlet 21 and the auxiliary outlet 80. FIG. 6 shows the valve 81 after a suitable counterclockwise adjustment from its FIG. 5 position. At this adjustment seat 25 has been backed off to the left by action of the threads 17, 27. Inlet 9 at this time communicates through valve 81 with both main outlet 21 and auxiliary outlet 80 only when the thermostatic valve 71 opens seats 25 and 41. At this setting of valve 81 (the high-temperature broil setting) the bypass passage 89 is closed by the solid part 87 of valve 81. Burner B is then modulated by the thermostatic valve 71 which regulates gas flow past seat 41 in response to oven temperatures which increase and decrease heating of bulb V by pilot I, thereby regulating gas flow through valve S and simultaneously regulating gas flow past seat 25.

At settings of valve 81 between the FIG. 5 off position and the FIG. 6 broil setting (see FIGS. 3 and 4), the inlet 9 communicates with outlets 21 and 80 through valve 81 and the thermostatic valve structure and, simultaneously, valve 81 and bypass passage 89 provide direct communication between inlet 9 and main outlet 21. This range of settings constitutes the bake range of settings and on-off operation of burner B occurs throughout this range due to the thermostatic valve structure opening and closing seat 41 in response to oven temperatures, thereby igniting and shutting off pilot I so as to open and close valve S. At the bake setting sufficient gas flows to burner B through bypass passage 89 so that bulb L will be sufficiently heated to effect closure of the thermostatically operated valve parts 25, 73 and 41, 75.

Extending through the conical plug valve 81 is a control stem 91, in the right end of which is a pin 93 which projects through sleeve 47. Thus when the control stem 91 is turned, the threaded bushing 27 is also turned and axial positions of the valve seats 25 and 41 may thus be changed relative to the range of thermostatic movement of the valve 71.

Figure 7:
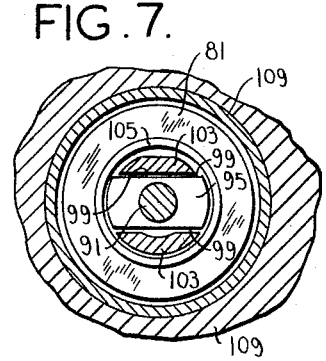
FIG. 7 is a fragmentary section taken on line 7—7 of FIG. 2.

The large end of the conical valve 81 is provided with a hollow stem 95 through which stem 91 is threaded. The threads are tight enough to carry stem 95 with valve 81 upon normal rotation of the valve but permitting the stem to be turned relative to the valve by a screw driver in the slotted end of the stem when the valve is held against rotation. This is for adjusting purposes. Control stem 91 extends through the hollow valve stem 95 and out beyond its left end (as viewed in FIG. 2). Hollow valve stem 95 has flat surfaces 99 (FIG. 7). A coupling 101 has forked projecting flanges 103 straddling valve stem 97 for conjoint rotation of the parts. Flanges 103 have a sliding connection with stem surfaces 99. A spring 105 reacts from the left end of plug valve 81 against coupling 101, biasing the coupling 101 away from the plug valve. Coupling 101 also has flanges 107 (FIGS. 2 and 8) which project from its end opposite from valve 81.

A hollow stepped cover 109 attached to valve body 3 by screws 111 encloses the outer end of control stem 91. A hollow cylindrical connector 113 projects through cover 109. A snap ring 115 on connector 113 limits inward movement of the connector into the cover by engagement with the left end of cover 109. The inner end of connector 113 is slotted to provide spaced flanges 117 which cooperate with flanges 107 on coupling 101 for turning the coupling (and thus valve 81) with the connector. A ring 119 (FIGS. 2 and 8) attached to the right end of connector 113 engages a shoulder 121 on cover 109 for limiting movement of connector 113 and coupler 101 to the left as viewed in FIG. 2. Stops 123 and 125 on the ring 119 and cover 109, respectively, limit rotation of the connector to less than 360°.

Figure 8:
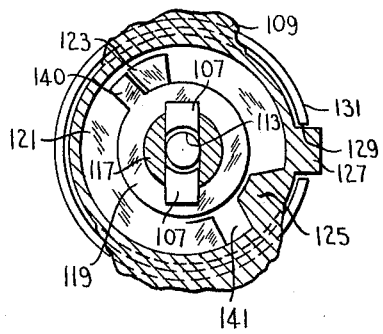
FIG. 8 is a fragmentary section taken on line 8—8 of FIG. 2.

At 127 in FIG. 8 is shown a key on cover 109 which is received in a keyway 129 in the stem of a dial housing 131. A dial 133 has in its inner surface a generally semicylindrical cavity 135 (FIG. 2). The outer end of connector 113 is partially cut away at 137 and has a press fit into cavity 135 in dial 133 for mounting the dial on the connector. A spring 139 reacts from the dial housing against the dial, thereby biasing the dial toward the left as viewed in FIG. 2. The pressure of spring 139 is not sufficient to force dial 133 off of connector 113.

A portion of the stop 123 on ring 119 is bent out of the plane of the remainder of the ring to form a latching ear 140 (FIG. 8) adapted to be received in a notch 141 in the shoulder 121 of cover 109 when the dial is at its off position. The dial spring 139 biases dial 133, connector 113 and ring 119 toward the left (as viewed in FIG. 2) to force ear 140 into the notch. Thus the dial will not be inadvertently turned to an "on" position. However, the dial may be easily turned to an "on" position by pushing in the dial against dial spring 139 to move ear 140 from notch 141 and then rotating the dial in a counterclockwise direction as viewed in FIG. 3. Inward movement of the connector 113 is limited by the snap ring 115.

Operation is as follows:

Baking operation will first be considered. Assuming the dial 133 is in the off position, then plug valve 81 is located as shown in FIG. 5 with the solid part 87 across fuel inlet 9, thereby blocking entrance of gas from the main M into the valve. Pilot light P is continuously supplied with gas from main M through gas line W so that it continuously burns after initial manual ignition.

Assume the oven is cold and it is to be heated for baking. The dial 133 is first depressed and then moved in a counterclockwise direction initially to place the parts at the desired setting in the bake range of valve openings (such as shown in FIGS. 2–4), at which the oven temperature is to be maintained by on-off burner operation. In this adjusting step the seat 25 is backed off toward the left. The amount depends upon the baking temperature desired (say 425°). Inlet 9 is at this time open permitting gas to flow from main M into plug valve 81 through openings 85 and from there it will flow along two routes. On one route it flows to chamber 15, then through passage 22 to the main outlet 21. Simultaneously gas from valve 81 is provided through openings 85 to the bypass passage 89 to the main outlet 21. From main outlet 21 gas flows to valve S and, when it is opened, to burner B where it is ignited from main pilot P for heating the oven.

Simultaneously gas from valve 81 passes through bushing 27 and across valve seat 41 to conduit 39 and into groove 29 in the bushing. This gas is supplied through passages 82, 84 and 86 to the auxiliary outlet 80 and, over gas line X, to the intermittent pilot I where it is ignited by pilot P. Pilot I heats bulb V and, by expansion of fluid in bulb V and line Z, valve S is opened for passing gas from the main outlet 21 to the burner B.

Since bypass passage 89 is open throughout the bake range, gas is always available to burner B whenever valve S is opened. When bulb L cools, valve member 71 is separated from seat 25 by some distance permitting a flow of gas to pass seat 25 and, as bulb L heats, the valve member 71 moves to the left as viewed in FIG. 2 to approach seat 25, thus restricting or throttling the volume of gas to the burner through this structure. When the oven reaches the desired temperature, the thermostatic valve structure closes seats 25 and 41, respectively. While this shuts off supply of gas through the thermostatic valve means, gas could still flow to the burner B over the bypass passage 89. However, closing of valve seat 41 shuts off the flow of gas to the intermediate cycling pilot I. Bulb V then cools thereby closing valve S which shuts off the flow of gas to burner B. As the oven temperature decreases, the thermostatic valve structure reopens, thus reigniting pilot I for reopening valve S to supply fuel to burner B for heating the oven. Thus in the baking range of temperatures, bypass passage 89 is open, and desirable on-off regulation of burner B results.

A feature of the invention is the comparatively large flow of gas that flows to the burner B over the passage 89 when the latter is open in the baking range of adjustments. When valve S is open most of the gas supplied to the burner B is obtained through passage 89. This amount alone is capable of driving the oven temperature to a value higher than the desired equilibrium baking temperatures as indicated on dial 133 of FIG. 3 (for example higher than 425° F.). Consequently at about the desired equilibrium temperature valve 71 is driven to close off both seats 25 and 41 which accounts for the above described on-off cycling action for baking. In addition, since the burner B when ignited has a large amount of gas flowing therethrough as supplied by passage 89 in the baking range, the velocity of gas through the burner B is much higher than was heretofore the practice in the cases of cycling burner control S. Heretofore, with lower gas flows in the baking range, burner flash-back would often occur, unless expensive cast iron burners were used, i.e. such as had special passages and ample cooling effects tending to prevent flash-back. By use of the present high volume of gas available to the burner B at all times over passage 89 in the baking range, low-cost sheet metal burners may be used. While these do not have such special passages and run hot, flash-back does not occur because of the comparatively high velocity of gas passing through the ports. This in and of itself is capable of preventing flash-back.

Next broiling operation will be considered. Dial 139 is moved to the broil setting by turning it about 270 compass degrees counterclockwise from its off position. This further retracts seat 25 and moves the plug valve 81 to the position shown in FIG. 6, in which gas inlet 9 is open and bypass passage 89 is closed. Thus fuel is provided for outlets 21 and 80 only between seats 25 and 41. As the temperature in the oven increases during broiling, valve member 71 is moved to the left toward seats 25 and 41, thereby throttling flow of gas to outlets 21 and 80. This reduces the rate at which gas is provided to burner B, and reduces the rate at which the oven is heated. While the gas supplied to the intermittent pilot I is reduced, it is not cut off. Bulb V in this range always remains sufficiently heated to keep valve S open. An approximate equilibrium temperature is reached before valve 71 closes on seats 25 and 41. In this manner continuous regulation of gas flow is obtained under broiling temperatures, which permits the burner flame to consume any resulting smoke. Any cooling of the oven from the desired equilibrium condition is sensed by bulb L which moves valve member 71 to the right gradually to increase the opening between the valve seats 25 and 41 to increase the volume of gas ultimately delivered to burner B. Larger modulating movements of the thermostatic valve occur principally when regulator R is first moved to the broil setting. The amount of modulating movement decreases until the stated approximate equilibrium condition is reached at about 600° F., for example. Thereafter modulating movements are quite small resulting in so-called straight line modulation.

In view of the above it will be seen that desirable on-off regulation of burner B occurs in the bake range of settings when the bypass passage 89 is open but in the broil range passage 89 is always closed and the thermostatic valve structure modulates without shutting off the burner B.

Figure 9:
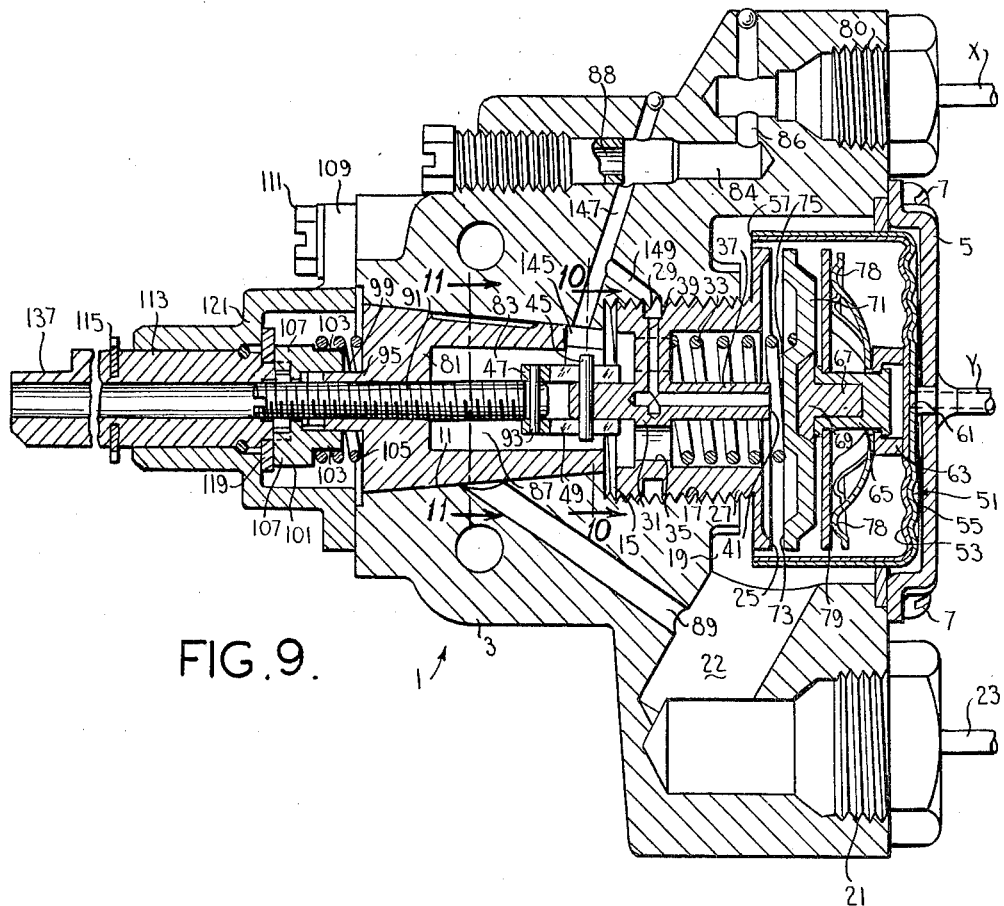
FIG. 9 is an axial section like FIG. 2 but showing another form of the invention, certain control knob parts being omitted.
Figure 10:
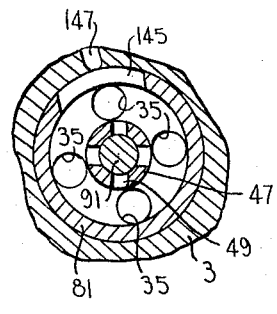
FIG. 10 is a cross section taken on line 10—10 of FIG. 9.
Figure 11:
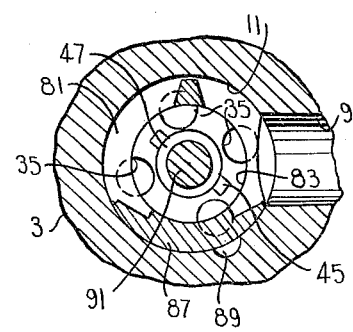
FIG. 11 is a cross section taken on line 11—11 of FIG. 9.

Some cycling pilot burners such as I are designed for a large amount of gas flow which, if not maintained, will permit the bulb V to cool to an extent that valve S will close. Under such conditions the form of the invention shown in FIGS. 9 and 10 is employed. In this embodiment valve 81 has on its outer surface at its smaller end a notch designated 145 which communicates with chamber 15 and can be placed in communication with a passage 147 leading to the passage 84 for delivery of fuel to outlet 80 and pilot I. The notch 145 in valve 81 is relatively short and when the valve is turned to positions where this notch is out of communication with passage 147 (i.e. the lower oven range of settings), gas is delivered to outlet 80 via a branch passage 149 communicating with passage 147 and groove 29 in bushing 27, this path for gas being controlled by the thermostatic valve structure previously described. At higher broiling temperatures the notch 145 and passage 147 are in communication and bypass passage 89 is closed. This form of the invention operates in the broiling range of temperatures as above described with the following exceptions:

Remembering that in the broiling range passage 89 is shut, the notch 145 has been so cut into the plug valve that as the desired broil temperature is set, additional gas is supplied through passage 147 to the cycling pilot to feed it a sufficient amount of gas to maintain the bulb V hot enough always to hold valve S open. It will be seen therefore, that this embodiment of the valve is particularly suitable for use with a high gas input intermittent pilot burner I since it permits a large volume of gas to be delivered to the intermittent pilot I at the high-temperature settings. The embodiment of FIGS. 1–8 on the other hand is most desirable for pilot burners which require a relatively low volume of gas input, or wherein the gas is under high pressure or has a high heating value. In other respects, the regulator of the FIGS. 9 and 10 embodiment is substantially the same as that previously described.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An oven temperature regulating system comprising a main burner for oven heating, a cycling pilot burner, a continuous pilot burner for igniting both the main burner and the cycling pilot burner, an operating gas valve for the main burner, thermostatic means responsive to cycling action of the cycling pilot burner for opening and closing said operating gas valve, control means having a main gas inlet, a main gas outlet, a main passage, a bypass, said main passage and bypass connecting the main gas inlet with the main gas outlet, said control means including an auxiliary passage connecting said main passage with said cycling pilot burner, a manual control valve for said gas inlet for opening and closing the same while said bypass is open and for closing said bypass without closing said gas inlet, said control means including a thermostatically controlled main valve responsive to heating by said main burner for controlling gas flow through said main passage by modulating action without complete closure of the main valve when said bypass is closed by the manual control valve, and without closing off gas supply through said auxiliary passage to the cycling pilot burner, said main valve when said bypass is open controlling the flow of gas to said auxiliary passage by closing and opening actions successively to extinguish and ignite the cycling pilot burner so as to close and open said operating gas valve of the main burner.

2. An oven temperature regulating system comprising a main burner for oven heating, a cycling pilot burner, a continuous pilot burner for igniting both the main burner and the cycling pilot burner, an operating gas valve for the main burner, thermostatic means responsive to cycling action of the cycling pilot burner for opening and closing said operating gas valve, control means having a main gas inlet, a main gas outlet, a main passage, a bypass, said main passage and bypass connecting the main gas inlet with the main gas outlet, said control means including an auxiliary passage connecting said main passage with said cycling pilot burner, a rotatable manual control valve for said gas inlet for opening and closing the same while said bypass is open and for closing said bypass without closing said gas inlet, a main valve, said main valve having a movable element for opening and closing action, thermostatic means responsive to heating by the main burner to move said element for controlling gas flow through said main passage by modulating action without movement to closed position when said bypass is closed and without closing off gas supply to the cycling pilot burner, said bypass when open supplying sufficient gas to the burner to heat said thermostatic means sufficiently to move said main valve element to seat thereby closing said auxiliary passage to extinguish the cycling pilot burner, whereby said operating gas valve of the main burner is closed, said valve element unseating upon cooling to admit gas to the cycling pilot burner for ignition from the continuous pilot burner and consequent opening of said burner control valve.

3. A gas regulator system according to claim 2 wherein said main valve has a fixed seat adjustable in position by rotation of said manual control valve to increase the amount of gas flowing through the main valve for addition to flow of gas through the bypass when it is open.

4. A gas regulator comprising a housing having a main inlet and a main outlet, a main passage through the housing connecting the inlet and outlet, a manual valve controlling flow of gas from the inlet to the main passage, an auxiliary outlet, an auxiliary passage through the housing between the main passage and the auxiliary outlet, a thermostatic valve in the main passage between the first valve and the main outlet, the thermostatic valve having two movable valve seats and a movable valve member controlling gas flow from the main passage to the main outlet through one valve seat and from the main passage to the auxiliary outlet through the other valve seat and the auxiliary passage, means coupling the manual valve to the valve seats for movement of the valve seats when the first valve is moved, a bypass between the main passage and the main outlet bypassing the thermostatic valve, the manual valve in a first range of opening positions thereof communicating the inlet with the main outlet through the main passage and the bypass and communicating the inlet with the auxiliary outlet through the thermostatic valve and auxiliary passage, the manual valve in a second range of open positions cutting off flow from the inlet to the bypass while communicating the inlet with the main and auxiliary outlets through the thermostatic valve and the main and auxiliary passages, said movable valve member when said manual valve is set in said second range thermostatically varying gas flow by movement without entirely closing on both of said seats and when said manual valve is set in said first range to vary gas flow to the auxiliary outlet through the auxiliary passage by movement with intermittent complete closing on both of said seats.

5. A gas regulator as set forth in claim 4 further including an additional passage communicating between the auxiliary passage and the main passage and bypassing the thermostatic valve, the manual valve in one range of positions opening communication between said additional passage and the main passage and in a second range of positions closing the last-named passage.

6. A gas regulator as set forth in claim 5 wherein the additional passage communicates with the main passage when the manual valve is in its second range of open positions.

7. A gas regulator comprising a housing having a main inlet and a main outlet, a main passage through the housing connecting the inlet and outlet, a portion of the passage communicating with the main inlet forming a valve seat for a manual valve, a manual valve movable relative to the seat for controlling flow of gas from the inlet to the main passage, an auxiliary outlet, an auxiliary passage through the housing between the auxiliary outlet and the main passage downstream of the manual valve, a thermostatic valve in the main passage between the first valve and the main outlet, the thermostatic valve having two movable valve seats and a movable valve member controlling gas flow from the main passage to the main outlet through one valve seat and from the main passage to the auxiliary outlet through the other valve seat and the auxiliary passage, means coupling the manual valve to the movable valve seats for movement of the valve seats when the manual valve is moved, a bypass between the manual valve seat portion of the main passage and the main outlet bypassing the thermostatic valve, the manual valve in a first range of open positions thereof communicating the inlet with the main outlet through the main passage and the bypass passage and communicating the inlet with the auxiliary outlet through the thermostatic valve and auxiliary passage, and the manual valve in a second range of open positions thereof blocking flow from the inlet to the bypass while communicating the inlet with the main and auxiliary outlets through the thermostatic valve and the main and auxiliary passages, said movable valve member when said manual valve is set in said second range thermostatically varying gas flow by movement without entirely closing on both of said movable seats and when said manual valve is set in said first range to vary gas flow to the auxiliary outlet through the auxiliary passage by movement with intermittent complete closing on both of said movable seats.

8. A gas regulator as set forth in claim 7 wherein the valve seat portion of the main passage is conical, and the first valve is a hollow plug valve having an opening through which gas may flow and a solid portion adapted alternately to close off communication between the main passage and the main inlet on the one hand and the bypass on the other hand.

9. A gas regulator as set forth in claim 8 further including an additional passage communicating between the auxiliary passage and the conical valve seat bypassing the thermostatic valve, the plug valve having a second opening for communicating the main passage with said additional passage in one range of positions of plug valve, said plug valve having a second solid portion for closing off communication between the main passage and the additional passage in a second range of valve settings.

10. A gas regulator comprising a housing having a main inlet and a main outlet, a main passage through the housing connecting the inlet and outlet, a conical valve seat in the passage, a hollow conical plug valve movable in the seat and having an opening and a solid portion for controlling flow of gas from the inlet through the plug valve to the main passage, an auxiliary outlet, an auxiliary passage through the housing communicating with the auxiliary outlet and communicating with the main passage between the plug valve and the main outlet, a thermostatic valve in the main passage between the plug valve and the main outlet, the thermostatic valve having two movable valve seats and a movable value member controlling gas flow from the main passage to the main outlet through one valve seat and from the main passage to the auxiliary outlet through the other valve seat and the auxiliary passage, means coupling the plug valve to the movable valve seats for movement of the valve seat when the plug valve is moved, a bypass between the conical valve seat and the main outlet bypassing the thermostatic valve, the intersection of the bypass and the conical valve seat being axially aligned with and circumferentially spaced from the connection between the main inlet and the conical valve seat, the plug valve in a first range of open positions thereof communicating the main inlet with the main outlet through the main passage and the bypass and communicating the inlet with the auxiliary outlet through the thermostatic valve and auxiliary passage, and the plug valve in a second range of open positions thereof cutting off flow from the inlet to the bypass while communicating the inlet with the main and auxiliary outlets through the thermostatic valve and the main and auxiliary passages, said movable valve member when said plug valve is set in said second range thermostatically varying gas flow by movement without entirely closing on both of said movable seats and when said plug valve is set in said first range varying gas flow to the auxiliary outlet through the auxiliary passage by movement with intermittent complete closing on both of said movable seats.

11. A gas regulator as set forth in claim 10 further including an additional passage communicating between the auxiliary passage and the smaller end of the conical valve seat, said plug valve having a notch in its smaller end for opening communication between the main passage and the additional passage through the plug valve.

12. A gas regulator as set forth in claim 11 wherein the notch and the opening in the plug valve are located relative to each other and relative to the intersections between the main passage and the inlet and additional passage so that the additional passage communicates with the inlet through the main passage and the plug valve when the plug valve is in its second range of open positions.

References Cited by the Examiner

UNITED STATES PATENTS 3,132,803 5/1964 Wantz et al. _____ 236—68
3,167,250 1/1965 Wantz et al. _____ 236—68

FOREIGN PATENTS 944,390 12/1963 Great Britain.

ALDEN D. STEWART, *Primary Examiner.*